Nov. 16, 1948.   O. CESAREO   2,453,743
SIGNALING SYSTEM AND TRAINING
DEVICE FOR TARGET TRACKING
Filed Dec. 6, 1943   3 Sheets-Sheet 1

INVENTOR
O. CESAREO
BY
ATTORNEY

Nov. 16, 1948.      O. CESAREO      2,453,743
SIGNALING SYSTEM AND TRAINING
DEVICE FOR TARGET TRACKING
Filed Dec. 6, 1943      3 Sheets-Sheet 3
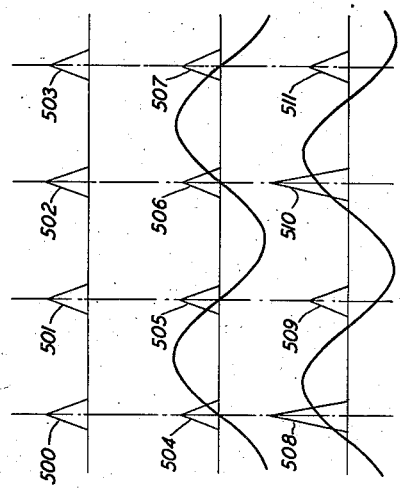
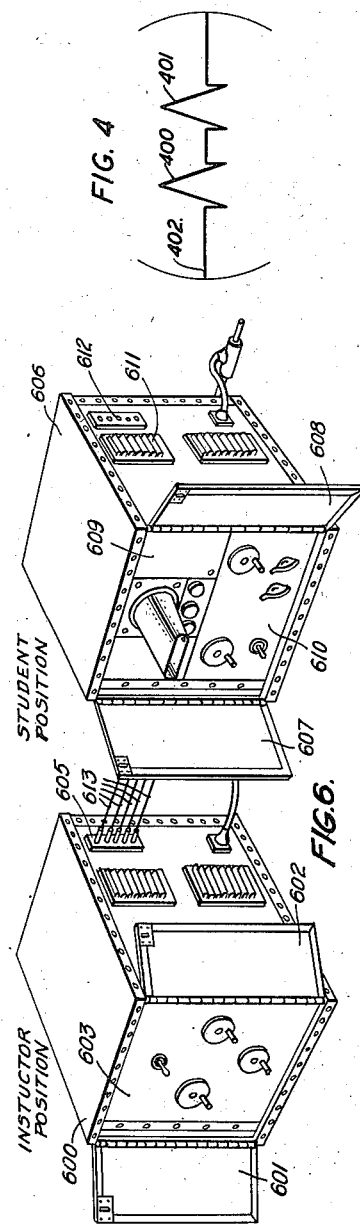
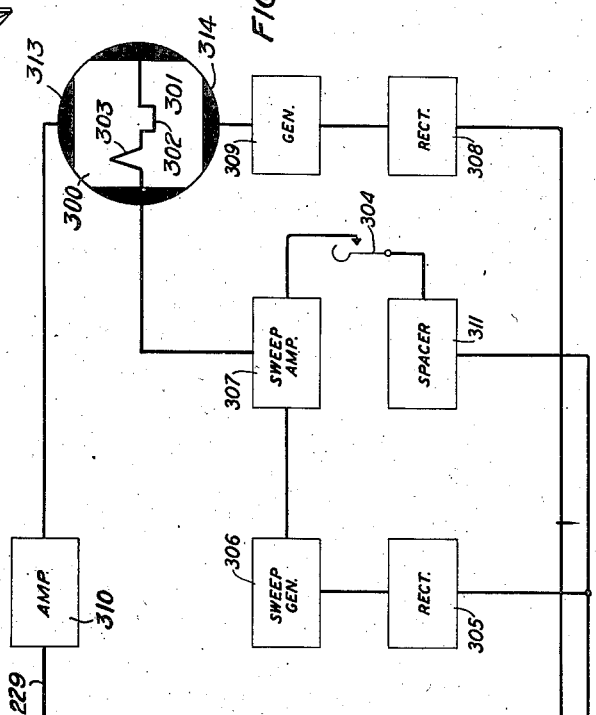
INVENTOR
O. CESAREO
BY
ATTORNEY Patented Nov. 16, 1948

2,453,743

UNITED STATES PATENT OFFICE 2,453,743

SIGNALING SYSTEM AND TRAINING DEVICE FOR TARGET TRACKING

Orfeo Cesareo, Washington Township, Bergen County, N. J., assignor to Bell Telephone Laboratories, Incorporated, New York, N. Y., a corporation of New York Application December 6, 1943, Serial No. 513,043

6 Claims. (Cl. 35—10)

This invention relates to signaling systems and apparatus and particularly to signaling systems and apparatus utilized for the location of distant objects.

An object of the invention is to simulate in terms of variable electrical quantities the movement of an imaginary object in space and to utilize these electrical quantities to train a student in the art of locating real objects.

Another object of the invention is to display before the student visual images representing the movement of an imaginary object and to enable him to test his skill in following said object.

Another object is to display before the student images and to enable him to control the behavior of said images for the purpose of measuring the angular relation of the imaginary object with respect to a reference point.

Numerous suggestions have been made in the past for deriving a continuous measurement of the range and angular location of an airplane or other object moving at a variable speed along a variable course in space. In one such system directive radio impulses are transmitted from the point of observation to the airplane, from which they return as echo impulses. These returning signals are received and utilized to form on a screen before the operator images which serve as a continuous representation of the range and angular location of the moving airplane. The operator is also provided with adjustable means, such as handwheels, which he manipulates to follow or otherwise control these changing images. If, for example, he accurately manipulates the azimuth angle wheel, its position at any instant is an exact measurement of the azimuth angle of the moving airplane with respect to the point of reference.

Since the accuracy of the information obtained from these object-locating systems depends largely upon the proficiency of the operators, it is desirable to give these operators a preliminary course of training under conditions which simulate as closely as possible the actual conditions which they will encounter in operating the object-locating systems.

Accordingly, a feature of the invention is a student training system in which images are formed before the student and are caused to vary in accordance with the changing range, azimuth angle, and elevation angle, of an imaginary object moving along an imaginary course in space, and in which the student is provided with means for testing his skill in following the object and deriving a continuous representation of the changing dimension. More specifically, a first alternating wave taken from a source of base phase and frequency is converted into impulses of like phase which are utilized to produce a pair of images or pips of like size and appearance on the screen of an oscilloscope; and a second wave taken from said source is utilized to vary the size and appearance of said images. To this end the second wave is applied, first to a course generating phase shifter which is driven in any suitable manner to introduce into said wave a phase variation representing the changing azimuth angle of an imaginary moving object, and then to a second phase shifter which is manipulated by the student in his effort to follow the moving object and to obtain a continuous measurement of the azimuth angle. Neglecting the operation of the student's phase shifter, the effect of the changing phase introduced by the course generating phase shifter is to produce an inequality in the size of the two images, the magnitude of which is a measure of the azimuth angle of the imaginary object. When, however, the student manipulates his phase shifter in an effort to follow the azimuth angle, he introduces a compensating phase change, the effect of which is to decrease the inequality in the size of the images; and, if he manipulates his phase shifter in exact accordance with the azimuth angle, the phase neutralization is complete and the images assume equal sizes on the screen.

A feature of the invention is a system of this character in which the student's position is equipped with a single phase shifter which he may use at will either to follow the range of the imaginary moving object or the angular relation of said object with respect to the point of reference. By simply operating a switch he may change from range observation to angular observation, either of which is controlled by the manually operated phase shifter, and in both cases he is guided by the images on the oscilloscope screen.

The foregoing and other features of the invention will be discussed more fully in the following detailed specification.

In the drawings accompanying the specification:

Figs. 1, 2 and 3, when arranged in order, constitute a diagram of a training system incorporating the features of the invention;

Figs. 2 and 3 illustrate equipment associated with a student's position, including the student's phase shifter and the oscilloscope in which he observes the moving images;

Fig. 4 is a fragmentary view illustrating the azimuth images on the oscilloscope screen;

Fig. 5 is a diagram showing the phase relation of the impulses controlling the formation of the images; and Fig. 6 illustrates the instructor's apparatus cabinet and one student's apparatus cabinet as they would be set up for training purposes.

Figure 1:
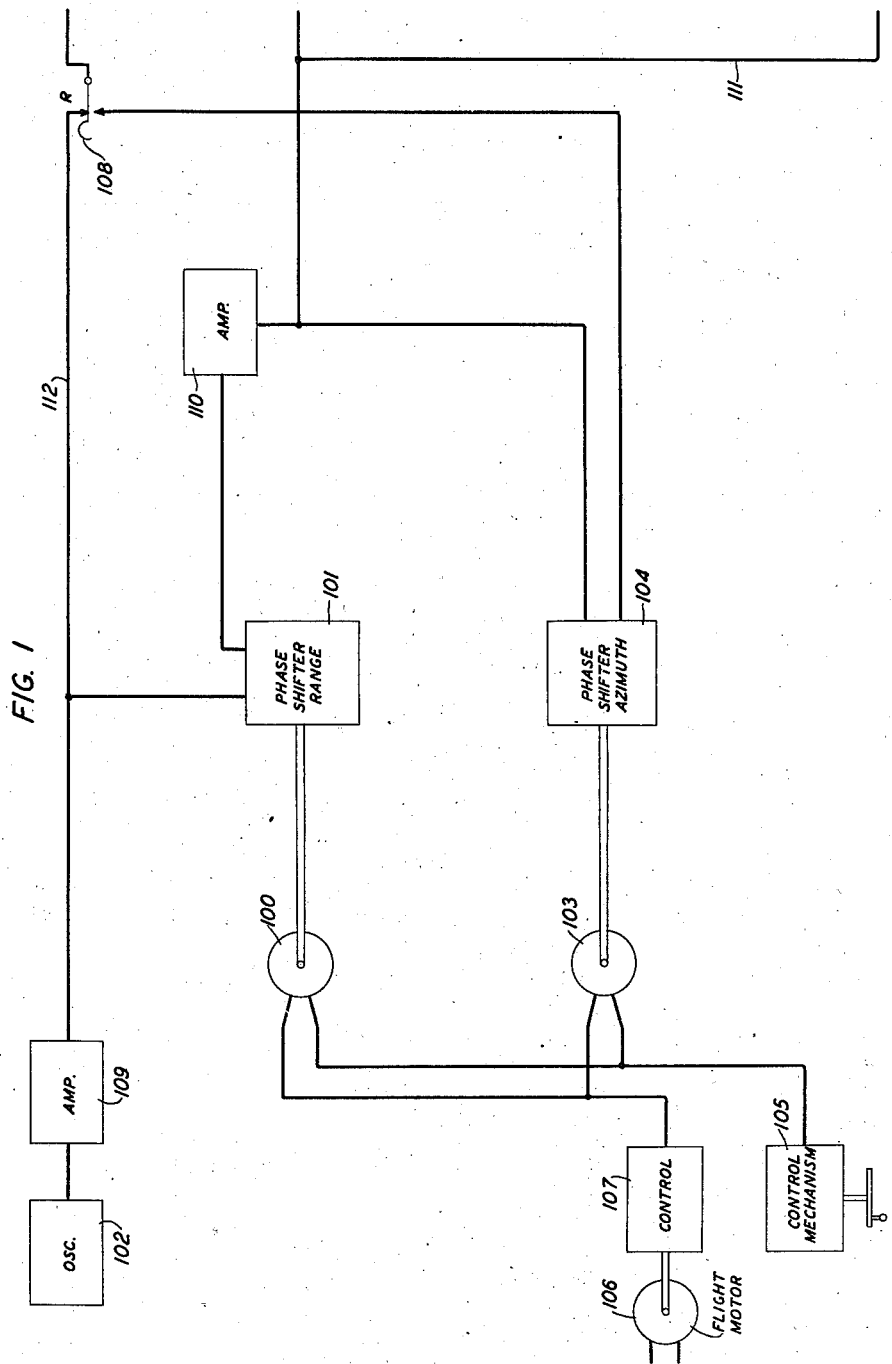
Fig. 1 shows a part of the course generating equipment associated with the instructor's position.
Figure 2:
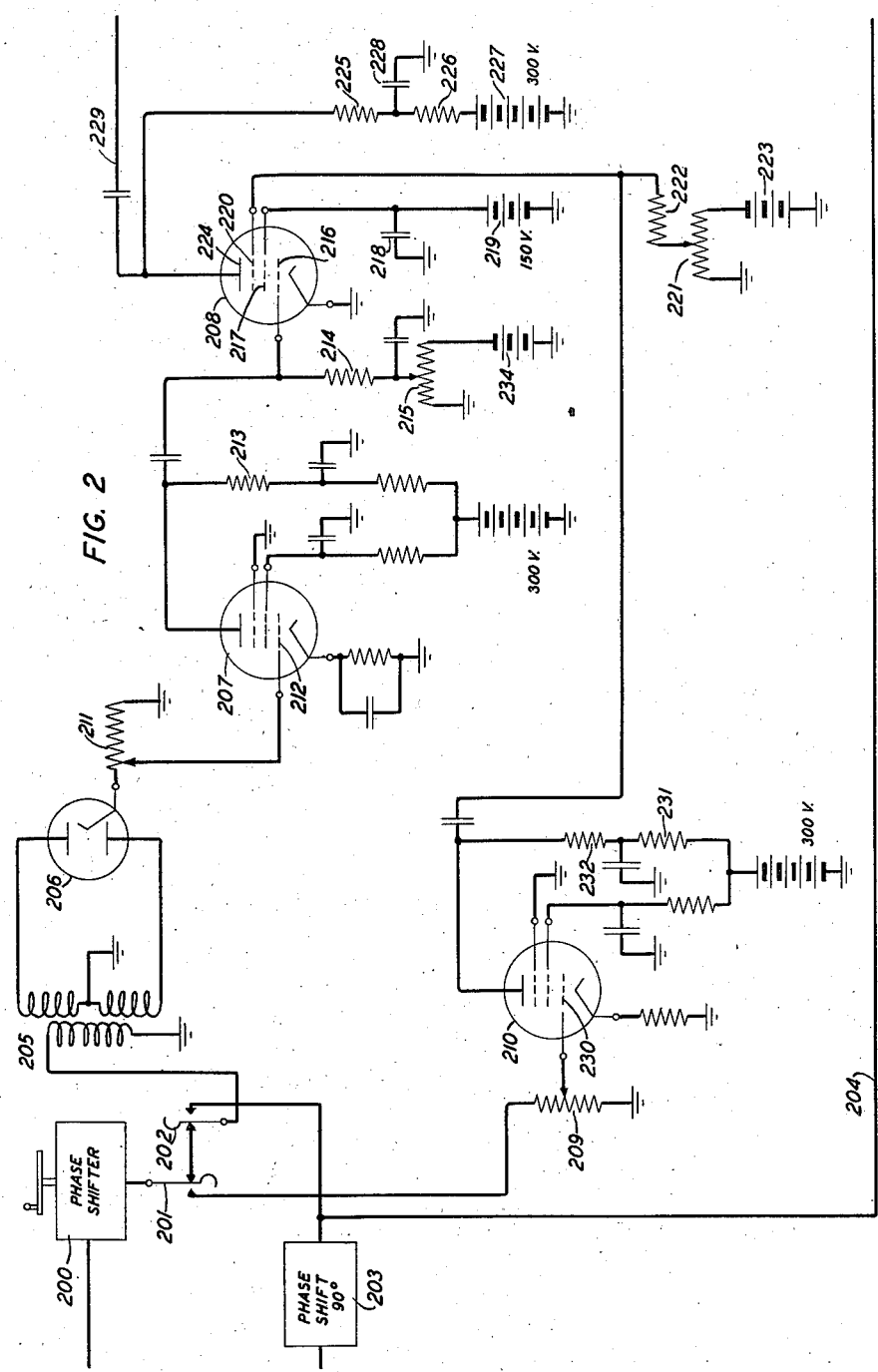

The three dimensions of primary interest in the location of a moving object, such as an airplane, are range, azimuth angle, and elevation angle, and the first requirement of a training system for students is to generate in terms of suitable electrical quantities artificial or imaginary courses of flight in which these range and angular dimensions vary in the desired manner. In the copending application of Andrews and Cesareo, Serial No. 513,042, filed December 6, 1943 which issued April 6, 1948, as Patent No. 2,438,888, a training system is disclosed in which straight-line courses are generated having varying values of range and azimuth angle, in which images are formed on the student's oscilloscope representing the varying range and azimuth angle, and in which the student is provided with means which he can manipulate to track or follow either the range or the azimuth angle of the imaginary object moving along the generated course. In this Andrews and Cesareo patent the instant values of the azimuth angle are represented on the oscilloscope screen by means of a pair of triangular shaped images or pips which are located in the center of the screen in notches formed in the horizontal trace thereof. While these image pips remain stationary throughout the imaginary course of flight, they vary in their altitude in accordance with the variations in the azimuth angle of the object, and the student has to manipulate his control device in such a manner as to maintain these images at equal altitudes. As long as he is able to do this he is accurately tracking the azimuth angle of the object.

In the system of the present invention improved means are utilized for forming the azimuth pips on the oscilloscope screen, for varying their altitude under the control of the course generator in accordance with the azimuth angle, and for enabling the student to introduce manually compensating changes which maintain equal amplitudes for these azimuth images for each instant that the student is accurately tracking the azimuth angle. For a better understanding of the present system reference is now made to the drawings.

The apparatus at the instructor's position is mounted in an apparatus cabinet 600, shown in Fig. 6, having front closure doors 601 and 602 and a control panel 603. The sides of the cabinet are provided with ventilation slots 604 and with cable jacks, such as 605, by which the instructor's cabinet may be connected with one or more students' positions. The apparatus at a student's position is mounted in an apparatus cabinet 606 having front closure doors 607 and 608, an oscilloscope panel 609 and a control panel 610. The sides of the cabinet 606 are provided with ventilation slots 611 and with cable jacks, such as 612, by which the cabinet may be connected by plug-ended cables 613 with the instructor's apparatus cabinet 600 and with other students' cabinets similar to cabinet 606.

The flight generator which is only partially disclosed in Fig. 1 may be of the same type as the one shown and described in detail in the copending application of D. H. Pennoyer, Serial No. 513,076, filed December 6, 1943, which issued April 6, 1948, as Patent No. 2,438,940. It includes a motor 100 for driving a range phase shifter 101 which introduces into an alternating wave taken from the base source 102 a change of phase, the instant value of which represents the range of the imaginary object with respect to the point of reference. It also includes a motor 103 for driving the azimuth phase shifter 104 which introduces into a wave taken from the output circuit of the phase shifter 101 a change of phase, the instant value of which represents the azimuth angle of the imaginary object. The course generator also includes suitable control mechanism 105 by which the instructor can preselect the desired course to be generated and a flight motor 106 and associated control circuits 107 for driving and controlling the generating mechanism after the instructor has made the desired setting.

Each student's position is equipped with an oscilloscope 300 having a luminescent screen on which a horizontal trace 301 is formed with a stationary center notch 302 therein and having a movable image pip 303 which represents the range of the imaginary object. While the student is tracking the range of the imaginary object he endeavors to manipulate his phase shifter 200 to control the phase of the wave forming the pip 303 in such a manner that the pip rests accurately in the notch 302. On the other hand, if it is desired to have the student follow the azimuth angle, the keys 108, 201, 202 and 304, all of which may be controlled by a single lever or button at the instructor's position, are moved to their alternate circuit positions, and the student now observes a pair of image pips 400 and 401 (Fig. 4) located in corresponding notches in the horizontal trace 402, these pips varying in their relative altitudes in accordance with the varying azimuth angle of the imaginary object. To trace the azimuth angle, therefore, he similarly manipulates his phase shifter 200 in an endeavor to maintain the images 400 and 401 at equal altitudes.

Examining the circuits of the system more closely and assuming for the moment that the keys are in the positions shown, namely, the positions for range tracking, it will be noted that a wave of base phase and frequency from the source 102, after undergoing amplification by a suitable amplifier 109, is applied to the phase shifter 101 of the course generator. The resulting phase-shifted wave in the output circuit of the shifter 101 is amplified by amplifier 110 and is then conducted over circuit 111 to the rectifier 305. The pulses resulting from the rectified wave are utilized by pulse and sweep circuits 306 and 307 of well-known types to control the beam of oscilloscope 300 to form the horizontal trace 301 in synchronism with the phase-shifted wave. At the same time a wave from the output of the shifter 101 is subjected to a constant shift of 90 degrees by a suitable circuit 203 and is then applied over conductor 204 to the rectifier 308. The resulting rectified impulses are utilized by the impulse generator 309 to produce the notch 302 in the horizontal trace 301. In view of the 90-degree relation between the phases of the wave which produces the trace and the wave which produces the notch, this notch will remain stationary on the screen and will be located in the center thereof.

Also a wave taken from the base source 102 is applied over conductor 112 through the contacts of key 108 to the student's phase shifter 200. The output wave from the shifter 200 is applied to the primary winding of transformer 205 through the normal contacts of keys 201 and 202. The secondary winding of this transformer is connected to the pulse rectifier 206, and the output pulses in this rectifier, after being inverted by the tube 207 and formed by the pulse generating tube 208 and amplified by a suitable amplifier 310, are applied to the vertical deflection plates 313 and 314 of the oscilloscope 300. These pulses, when applied to the oscilloscope, form the image pip 303 which moves along the horizontal trace 301 in accordance with the changing range introduced by the phase shifter 101, and the student by manipulating the phase shifter 200 attempts to track the range by holding the pip 303 accurately centered in the notch 302.

When the student wishes to test his skill in tracking the azimuth angle, the keys 108, 201, 202 and 304 are shifted to their alternate positions. In this case the wave applied over the circuits 111 and 204 to the impulse rectifiers 305 and 308 cause, as before, the formation on the oscilloscope screen of a persistent trace 301 having a center notch therein. However, the key 304 is now closed to render the image spacing mechanism 311 effective, and the result is that alternate sweeps of the oscilloscope beam are spaced to give the effect of two notches, instead of one, located side by side in the central portion of the screen as seen in Fig. 4. Furthermore, the key 202 now being in its alternate position, a wave taken from the output circuit of the phase shifting device 203 is applied through transformer 205, and the resulting impulses appearing in the output circuit of the tube 208 are applied to the vertical plates of the oscilloscope to form at each sweep of the beam an image pip which is accurately located within the concurrently formed notch, resulting, therefore, in the appearance of two image pips 400 and 401 on the screen of the oscilloscope. One method by which these images are spaced is disclosed in detail in the above-noted patent of Andrews and Cesareo.

The two image pips 400 and 401 thus formed side by side on the screen from the wave taken from the output circuit of amplifier 110 will, unless subjected to the influence of the course generator, remain at equal amplitudes. However, it is the relative change in the amplitudes of these images that denotes to the student the changing azimuth angle of the imaginary object which he is supposed to follow. To effect this change a wave taken from the output circuit of the amplifier 110 is applied to the azimuth phase shifter 104 of the course generator which introduces therein a change of phase representative of the changing azimuth angle of the imaginary object. The output from the shifter 104 is now applied through the contacts of key 108 to the student's phase shifter 200, and the output circuit of the student's phase shifter is connected over the contacts of key 201 to the input resistor 209. In a manner to be described more fully hereinafter the voltage developed across the resistor 209 as a result of the application of this wave from the student's phase shifter is applied, after amplification by the amplifier 210, to the impulse generating tube 208 where it serves to vary the amplitudes of consecutive impulses according to the phase relation between the wave controlled by the student and the wave which forms the image pips 400 and 401. If, therefore, the student manipulates his phase shifter 200 to neutralize precisely the shift introduced by the phase shifter 104 of the course generator, no effect is produced on the pips 400 and 401, and they remain at equal altitudes. This means that the student is exactly on the target with respect to the azimuth angle. However, if his manipulation of the phase shifter 200 is in error by a given amount in either direction at any particular instant, the voltage applied from the amplifier 210 to the pulse generating tube 208 causes an increase in the altitude of one of the pips 400, 401 and a corresponding decrease of the altitude of the other.

The details of the circuit will now be described, and for this purpose it may be assumed that the instructor preselects a desired course of flight by setting the control mechanism 105 and starting the flight motor 106. It will be sufficient for an understanding of the system to assume that the student is instructed to follow the azimuth angle of the imaginary airplane as it moves along the imaginary course in space. As previously explained the horizontal trace 301 is formed on the screen of the oscilloscope, with two notches therein, by means of waves taken from the output circuit of the amplifier 110. It will be noted that these waves are undergoing a constant shift of phase by the range phase shifter 101, which is operating under the control of motor 100 while the flight generator is in operation. But the phase shifter 101 has no adverse effect upon the azimuth images since all of the waves utilized to form and control these images are subjected to the same common change of phase. Also as above mentioned the image pips 400 and 401 are formed by a wave taken from the output circuit of the phase-shifting mechanism 203 and applied to the transformer 205. The sine wave appearing in the secondary windings of the transformer 205 is fully rectified by the rectifier 206 to produce in the output resistor 211 a series of pulses of the same polarity and in phase with the cycles of the alternating wave. These pulses are applied to the control grid 212 of the tube 207. The purpose of this is to invert the impulses so that their peaks may be selected for the formation of the pulses to be applied to the oscilloscope. The inverted impulses thus produced in the resistor 213 in the anode circuit of tube 207 are applied to a circuit comprising the resistors 214 and 215. The voltage thus developed is applied to the control grid 216 of the pulse generating tube 208. The control grid 216 is normally biased beyond cutoff by the negative potential applied from battery 234 through the variable resistor 215. The screen grid 217 of this tube is connected to the condenser 218 and to the positive source of potential 219. The suppressor grid 220 is connected to the variable resistor 221 through resistor 222 and is normally maintained at a negative potential by the battery 223. The anode 224 of the tube 208 is connected through resistors 225 and 226 to the positive pole of the anode source 227, a condenser 228 being connected to the midpoint of resistors 225 and 226. The positive impulses, however, when applied to the variable resistor 215 from the preceding tube, cause the tube 208 to conduct, and impulses are produced in the output circuit 229 which are in phase with the original wave applied to the transformer 205. These impulses are amplified by the amplifier 310 and are then applied to the oscilloscope 300 to produce the image pips 400 and 401.

Assuming that the potential on the suppressor grid 220 remains constant, all of the succession of impulses appearing in the circuit 229 are of equal amplitude. This relation is illustrated in Fig. 5 where impulses 500, 501, 502, 503, etc., are all seen to be of the same amplitude. However, the phase shifter 104 of the course generator is constantly shifting the phase of the wave applied thereto, and this wave will, unless corrected by the student, vary accordingly the potential applied to the suppressor grid 220. As above noted, the output wave from the phase shifter 104 is applied through the student's phase shifter 200 to the input resistor 209 of the tube 210. The varying voltage across the resistor 209 varies accordingly the potential on the control grid 230 of the amplifier tube 210, and a corresponding potential is developed across the resistors 231 and 232 in the output circuit of the tube. The varying potential of the resistors 231 and 232 is applied to the variable resistor 221 and likewise to the suppressor grid 220 of the tube 208. If the student manipulates the phase shifter 200 to exactly neutralize the phase shift introduced by the shifter 104 of the course generator, the voltage wave applied to the suppressor grid 220 will have its nodal points occurring in phase with the impulses applied to the control grid 216. Therefore, the voltage wave applied to the suppressor grid 220 will have no effect on the impulses 504, 505, 506, 507, etc., occurring in the output circuit 229 of the tube 208. However, if the student fails to neutralize the changing phase in the wave in the output circuit of the phase shifter 104, the wave applied to the suppressor grid 220 will be out of phase by a corresponding amount with the impulses applied to the control grid 216. Hence, as seen in Fig. 5, the positive potential applied to the suppressor grid 220 in one half cycle will accentuate the impulse produced by the corresponding potential applied to the control grid 216, and an impulse 508 of increased amplitude will appear in the output circuit 229. Similarly, the negative impulse applied to the suppressor grid 220 on the next half cycle will subtract from the positive pulse supplied to the control grid, and an impulse 509 of reduced amplitude will appear in the output circuit. Likewise the impulse 510 of the next cycle will be increased in amplitude and the impulse 511 will be decreased and so on for each succeeding pair of impulses. Thus the impulses of unequal amplitude supplied to the plates of the oscilloscope 300 will cause the image pips 400 and 401 to assume unequal altitudes, indicating to the student that he is not accurately tracking the azimuth angle of the imaginary object. Noting the inequality in the altitudes of the images 400 and 401, the student realizes he is in error and also the sense of the error and endeavors to manipulate his phase shifter accordingly to bring the images 400 and 401 back to equal altitudes.

What is claimed is:

1. In an apparatus for training students in the art of locating moving objects the combination of a source of alternating waves of base phase, a screen, means for utilizing a wave from said source to form visible images on said screen, a phase shifter, means for applying to said phase shifter a second wave from said source, means for operating said phase shifter to vary the phase of said second wave in accordance with the changing angular relation, with respect to a reference point, of an imaginary object moving along a given course in space, means for utilizing said second wave of shifted phase to vary the relationship of said images in accordance with said changing angular relation, a second phase shifter operated by the student for introducing another variation of phase in said second wave, and means effective when the phase variation introduced by the student bears a definite relationship to that introduced by said first phase shifter for maintaining a desired relationship between said images.

2. In an apparatus for training students in the art of locating moving objects the combination of a source of alternating waves of base phase, a screen, means for utilizing a wave from said source to form a pair of visible images on said screen, a phase shifter, means for applying to said phase shifter a second wave from said source, means for operating said phase shifter to vary the phase of said second wave in accordance with the angular relation, with respect to a reference point, of an imaginary object moving along a given course in space, means for utilizing said second wave of shifted phase to vary the conformation of said images in accordance with said changing angular relation, a second phase shifter operated by the student for introducing another variation of phase in said second wave, and means effective when the phase variation introduced by the student bears a definite relationship to that introduced by said first phase shifter for maintaining a desired conformation of said images.

3. In an apparatus for training students in the art of locating moving objects the combination of a source of alternating waves of base phase, a screen, means for utilizing a wave from said source to form a pair of visible images on said screen, a phase shifter, means for applying to said phase shifter a second wave from said source, means for operating said phase shifter in a predetermined manner to vary accordingly the phase of said second wave to represent the changing azimuth angle of an imaginary object moving in space, means for utilizing said second wave of shifted phase to vary the sizes of said images in accordance with said changing azimuth angle, a second phase shifter operated by the student for introducing a compensating variation of phase in said second wave, and means effective when the phase variation introduced by the student fully compensates that introduced by said first phase shifter for maintaining a definite relationship between the sizes of said images.

4. In an apparatus for training students in the art of locating moving objects the combination of a source of alternating waves of base phase, a screen, means for utilizing a wave from said source to form visible images on said screen, a phase shifter, means for applying to said phase shifter a second wave from said source, means for operating said phase shifter to vary the phase of said second wave in accordance with the changing angular relation, with respect to a reference point, of an imaginary object moving along a given course in space, means for utilizing said second wave of shifted phase to vary the relationship of said images in accordance with said changing angular relation, a second phase shifter, manual means controlled by the student for operating said second phase shifter to introduce another variation of phase in said second wave, and means effective when the phase variation introduced by the student bears a definite relationship to that introduced by said first phase shifter for maintaining a desired relationship between said images, the instant position of said manual means serving as a measure of said angular relation each instant that the desired relationship between said images is maintained.

5. In an apparatus for training students in the art of locating moving objects the combination of a source of alternating waves of base phase, a screen, means for utilizing a first wave from said source to produce impulses in phase therewith, means for utilizing said impulses to form a pair of spaced images of equal sizes on said screen, a phase shifter, means for applying to said phase shifter a second wave from said source, means for operating said phase shifter to vary the phase of said second wave in accordance with the changing azimuth angle of an imaginary object moving in space, means for utilizing said wave of shifted phase to vary the sizes of said images in accordance with said changing azimuth angle, and a second phase shifter operated by the student for introducing another phase variation in said second wave for the purpose of maintaining said images of equal sizes.

6. In an apparatus for training students in the art of locating moving objects the combination of a source of alternating waves of base phase, a screen, means for utilizing a wave from said source to produce a visible linear trace on said screen, means for producing a plurality of stationary notches in said trace, means for utilizing a second wave from said source for forming a visible image in each of said notches, a phase shifter, means for applying to said phase shifter a third wave from said source, means for operating said phase shifter to vary the phase of said third wave in accordance with the changing azimuth angle of an imaginary object moving in space, means for utilizing said third wave of shifted phase to vary the sizes of said images in accordance with said changing azimuth angle, a second phase shifter operated by the student for introducing another variation of phase in said third wave, and means effective when the phase variation introduced by the student bears a definite relationship to that introduced by said first phase shifter for equalizing the sizes of said images.

ORFEO CESAREO.

REFERENCES CITED

The following references are of record in the file of this patent:

UNITED STATES PATENTS

| Number | Name | Date |
| --- | --- | --- |
| 1,939,706 | Karnes | Dec. 19, 1933 |
| 2,321,799 | Cone | June 15, 1943 |
| 2,399,661 | Bowie | May 7, 1946 |
| 2,416,089 | Jones | Feb. 18, 1947 |